United States Patent
Aizawa et al.

(10) Patent No.: US 7,885,356 B2
(45) Date of Patent: Feb. 8, 2011

(54) RECEIVER AND RECEIVING METHOD

(75) Inventors: Masami Aizawa, Kanagawa (JP); Kenichi Tokoro, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 631 days.

(21) Appl. No.: 11/964,212

(22) Filed: Dec. 26, 2007

(65) Prior Publication Data

US 2008/0192845 A1 Aug. 14, 2008

(30) Foreign Application Priority Data

Dec. 28, 2006 (JP) ............................. 2006-356368

(51) Int. Cl.
*H04L 27/00* (2006.01)
(52) U.S. Cl. ..................................... 375/316
(58) Field of Classification Search .................. 375/316, 375/232, 340, 260; 370/389; 714/755
See application file for complete search history.

(56) References Cited

U.S. PATENT DOCUMENTS 6,819,670 B1 * 11/2004 Fenner ........................ 370/392
7,433,438 B2 * 10/2008 Paik et al. ................... 375/367
2002/0145680 A1 * 10/2002 Hong ........................ 348/725

FOREIGN PATENT DOCUMENTS

| JP | 2002-084255 A | 3/2002 |
|---|---|---|
| JP | 2005-065219 A | 3/2005 |

* cited by examiner

*Primary Examiner*—Khai Tran
(74) *Attorney, Agent, or Firm*—Foley & Lardner LLP

(57) ABSTRACT

A receiver includes a receiving section configured to receive digital broadcasts; a demodulating section configured to demodulate a signal received by the receiving section and output a frame-based signal including a plurality of symbols; a detecting section configured to detect a symbol position in a frame-based signal provided from the demodulating section; a decoding section configured to decode a frame-based signal from the demodulating section in accordance with a symbol position; a symbol counter configured to output a count output specifying a symbol position in a signal decoded in the decoding section; and a control section configured to control counting of the symbol counter on the basis of a symbol position detected by the detecting section and on a count value of the symbol counter.

20 Claims, 7 Drawing Sheets

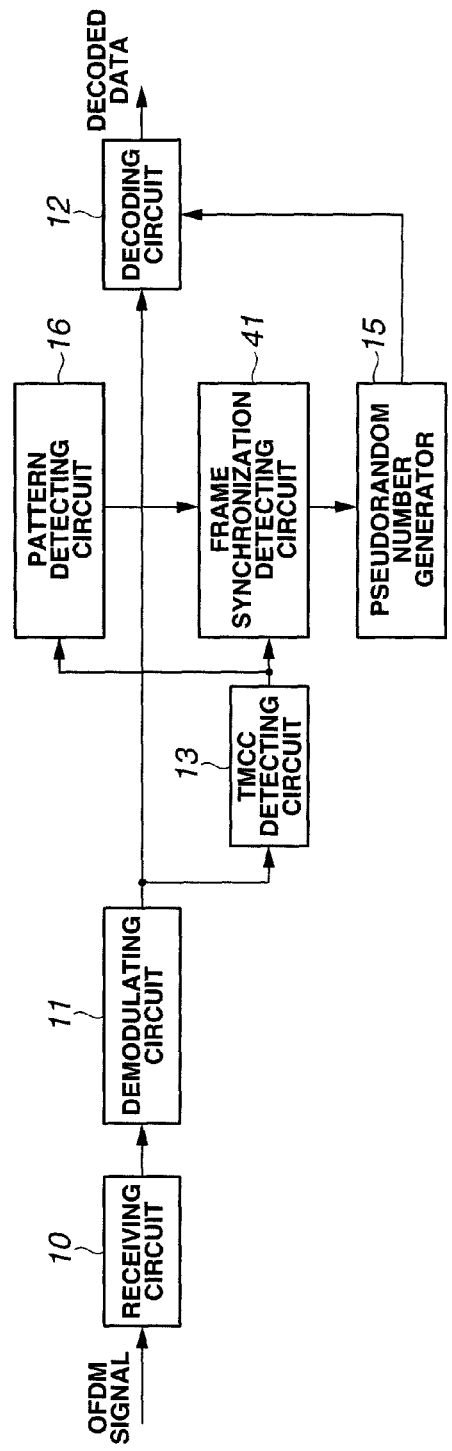
FIG.6
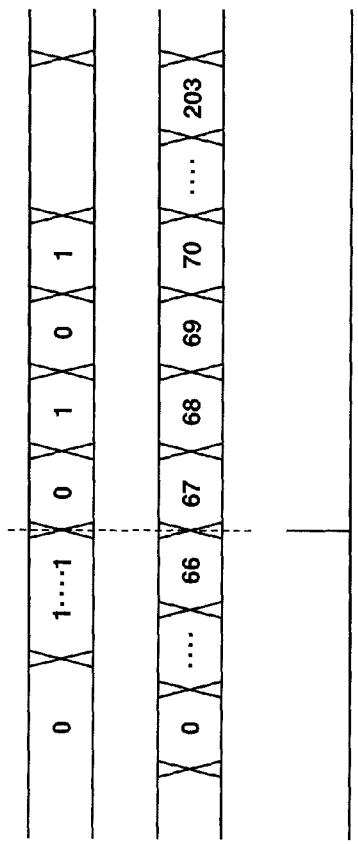
FIG.7A
FIG.7B
FIG.7C

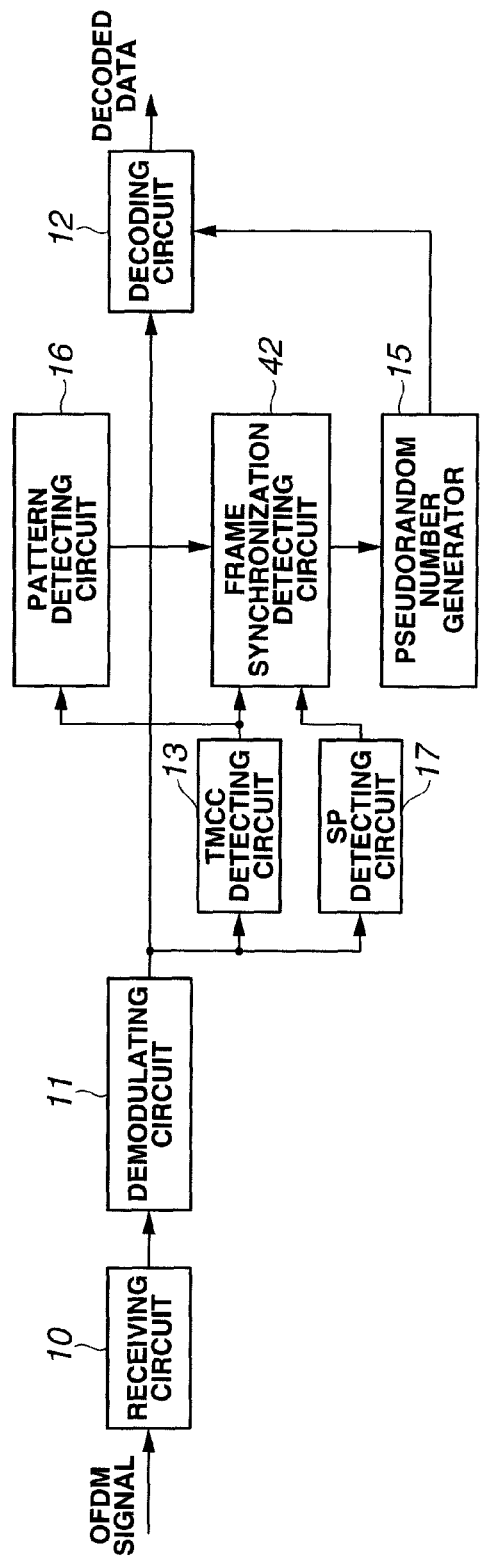

RECEIVER AND RECEIVING METHOD

CROSS REFERENCE TO RELATED APPLICATION

This application is based upon and claims the benefit of priority from the prior Japanese Patent Application No. 2006-356368 filed on Dec. 28, 2006; the entire contents of which are incorporated herein by reference.

BACKGROUND OF THE INVENTION

1. Field of the Invention

The present invention relates to a receiver and a receiving method suitable for OFDM applied to mobile communication systems, wireless LAN systems and the like.

2. Description of the Related Art

Digital television broadcasting has been started recently. OFDM (Orthogonal Frequency Division Multiplexing) modulation is used as a transmission scheme for terrestrial television broadcasting systems in Europe and Japan. An advantage of the OFDM is its ability to reduce delay interference in multipath transmission channels which is essential transmitting conditions to terrestrial television broadcasting systems by transmitting wideband signals by a large number of orthogonal carriers.

Digital broadcasting in Japan has adopted ISDB-T. In ISDB-T, signal processing, such as error correction coding, interleaving coding, and digital modulation, is applied to a transport stream (TS) specified in the MPEG-2 standard, and the TS is OFDM-modulated and output.

In ISDB-T, 108 OFDM symbol carriers in the frequency domain make up one block and, one, two, or four blocks make up one segment, depending on modes. That is, the number of carries in one segment is 108, 216, or 432. In ISDB-T, a bandwidth equivalent to 13 segments is used for transmission.

Also in ISDB-T, 204 OFDM symbols make up one frame in the time domain. TS transmission and energy spreading are performed on a frame-by-frame basis.

ISDB-T allows hierarchical transmission in which multiple layers of data with different transmission properties are transmitted simultaneously. Each layer includes one or more OFDM segments, and parameters such as a carrier modulation scheme, a coding rate of inner codes, and a time interleave length can be specified for each layer.

Information about such layers and a frame synchronization signal is transmitted as TMCC (Transmission and Multiplexing Configuration Control). TMCC is into inserted every block of each symbol. That is, one carrier of each block is allocated to TMCC and one symbol contains 1-bit BPSK-modulated TMCC information. Accordingly, 204 bits of TMCC information is transmitted in one frame in each block.

16 bits of the 204 bits of TMCC information in an OFDM frame are a synchronization signal. A receiver detects the synchronization signal to establish frame synchronization. In ISDB-T, energy spreading is performed in order to prevent concentration of energy on a particular frequency. Energy spreading is accomplished by adding pseudorandom numbers to data by using a PN (pseudorandom number) generator. The initial value of the pseudorandom generation is provided at the start of a frame. Decoding cannot be performed unless a pseudorandom number value is known. Therefore, when a synchronization signal is detected halfway in a frame, synchronization is established at the start of the frame subsequent to the frame in which the synchronization signal is detected.

Thus, ISDB-T has a drawback that it takes a relatively long time to establish synchronization.

Therefore, Japanese Patent Laid-Open No. 2002-84255 discloses a technique that, when a synchronization signal is detected halfway in a frame, a pseudorandom number generated at the point is calculated, thereby enabling decoding to be started with the symbol immediately after the synchronization is detected. However, digital broadcasting, in which multiple modes and layers are set as mentioned above, requires a huge amount of calculation and memory capacity in order to calculate pseudorandom number values for all settings.

In ISDB-T, two types of synchronization signals having patterns different with each other are alternately used in every other frame. Accordingly, time for two or more frames is required for establishing full synchronization. Japanese Patent Laid-Open No. 2005-65219 discloses a technique that calculates reliability in order to successfully establish synchronization using only one frame. However, the technique proposed in Japanese Patent Laid-Open No. 2005-65219 cannot establish synchronization until the start of a next frame at which the initial value for energy spreading is provided even when a synchronization signal is detected halfway in the previous frame.

SUMMARY OF THE INVENTION

A receiver in one mode of the present invention includes a receiving section configured to receive digital broadcasts; a demodulating section configured to demodulate a signal received by the receiving section and output a frame-based signal including a plurality of symbols; a detecting section configured to detect a symbol position in a frame-based signal provided from the demodulating section; a decoding section configured to decode a frame-based signal from the demodulating section in accordance with a symbol position; a symbol counter configured to output a count output specifying a symbol position in a signal decoded in the decoding section; and a control section configured to control counting of the symbol counter on the basis of a symbol position detected by the detecting section and on a count value of the symbol counter.

BRIEF DESCRIPTION OF THE DRAWINGS

FIG. 6 is a block diagram showing a second embodiment of the present invention;

FIGS. 7A, 7B, and 7C are block diagrams illustrating an operation according to the second embodiment;

FIG. 8 is a block diagram showing a third embodiment of the present invention; and FIGS. 9A, 9B, and 9C are diagrams illustrating an operation according to the third embodiment.

DETAILED DESCRIPTION OF THE PREFERRED EMBODIMENTS

Embodiments of the present invention will be described with reference to the accompanying drawings.

First Embodiment

Figure 1:
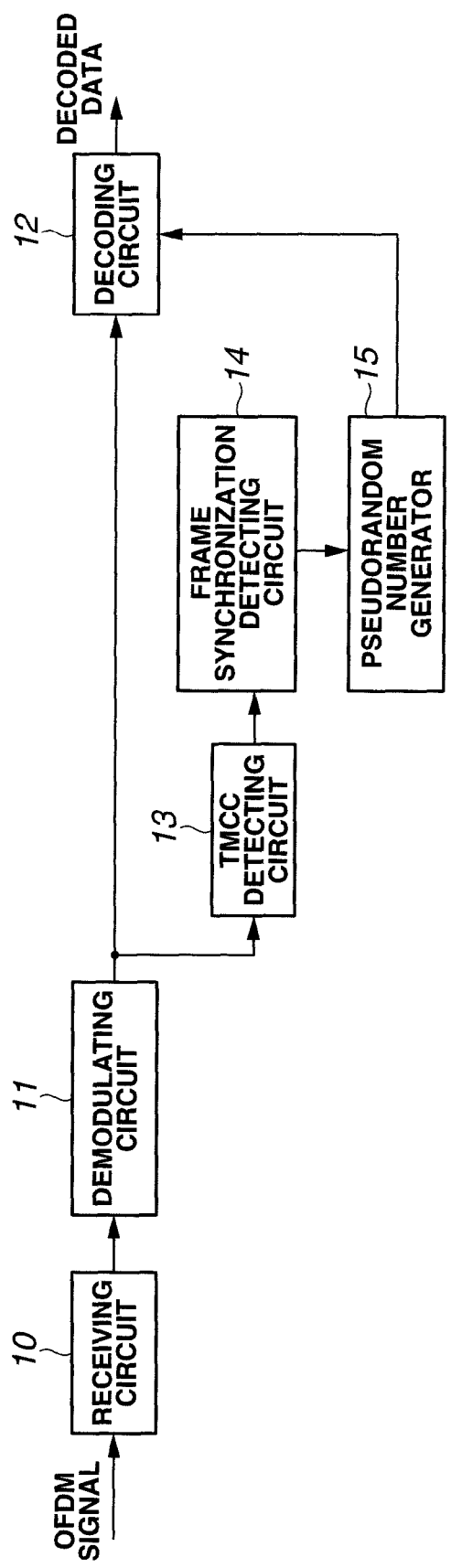
FIG. 1 is a block diagram showing a receiver according to a first embodiment of the present invention.

FIG. 1 is a block diagram showing a receiver according to a first embodiment of the present invention.

A baseband OFDM signal is input in a receiving circuit 10 in FIG. 1. The OFDM signal can be obtained by tuning in on the OFDM signal received at an antenna, not shown, with a tuner and detecting the OFDM signal with quadrature detection. The receiving circuit 10 removes guard intervals from the baseband OFDM signal and transforms the OFDM signal in a time domain to an OFDM symbol in a frequency domain by FFT (Fast Fourier transform). The OFDM symbol is provided to a demodulating circuit 11.

The demodulating circuit 11 restores original data from the input OFDM symbol. For example, each sub-carrier of OFDM symbols has been modulated with a modulation scheme such as PSK modulation or QAM modulation and the demodulating circuit 11 restores original data by demodulation corresponding to the modulation scheme used.

An output from the demodulating circuit 11 is provided to a decoding circuit 12. The decoding circuit 12 performs the reverse of inner coding and outer coding, which are error correction applied at the transmitter side, and the reverse of energy spreading to restore data transmitted by the OFDM signal. The inner coding and outer coding may be convolutional coding, RS coding or the like. While specific types of coding have been given by way of example, the present invention is not limited to these.

The output from the demodulating circuit 11 is also provided to a TMCC detecting circuit 13. The TMCC detecting circuit 13 detects TMCC inserted in each OFDM frame from the output of the demodulating circuit 11.

Figure 2:
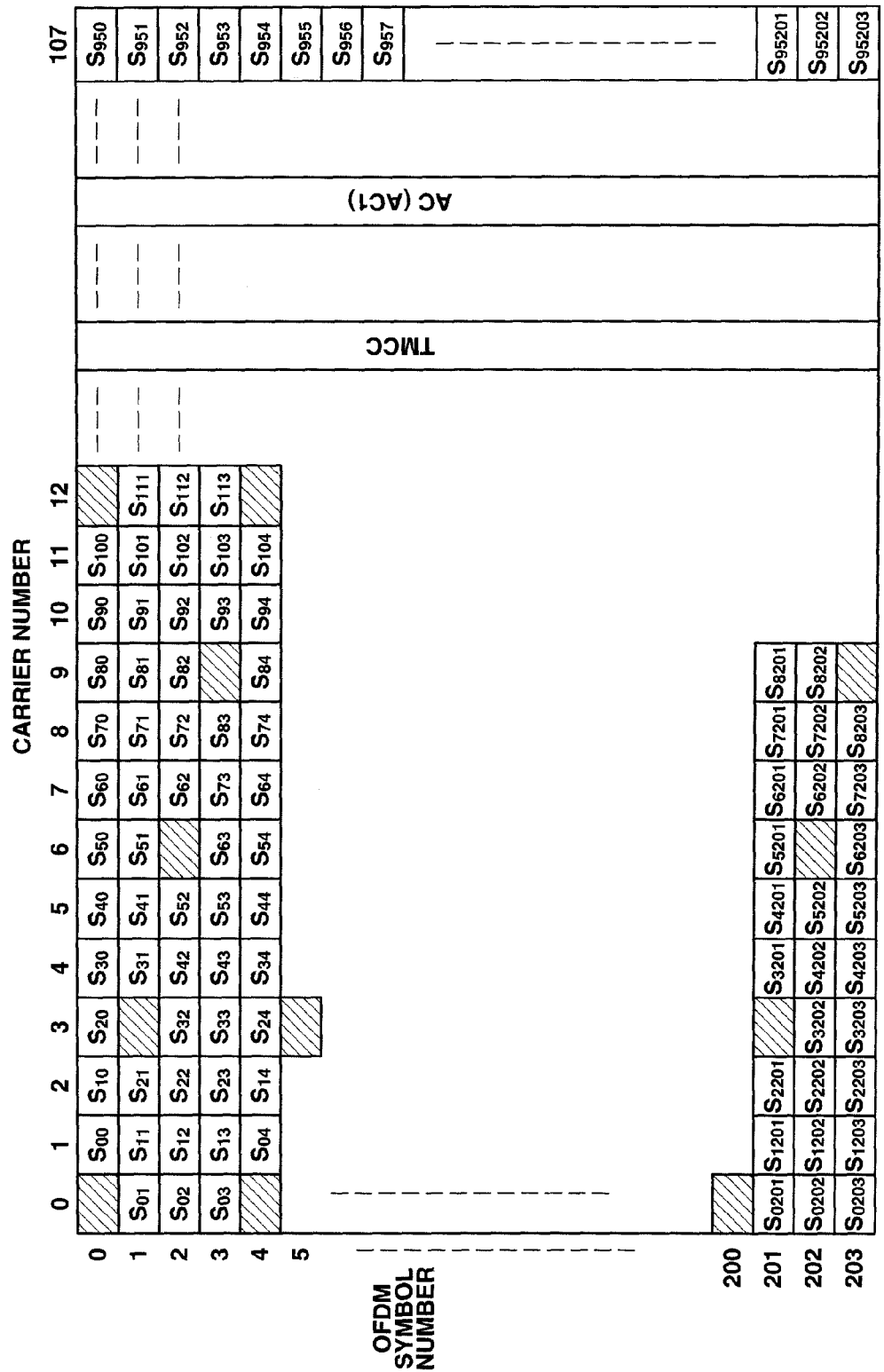
FIG. 2 is a diagram illustrating a configuration of an OFDM frame, in which the horizontal axis represents carrier numbers (frequency domain) and the vertical axis represents symbol numbers (time domain)

FIG. 2 is a diagram illustrating a configuration of an OFDM frame. The horizontal axis in FIG. 2 represents carrier numbers (frequency domain) and the vertical axis represents symbol numbers (time domain). The diagram of FIG. 2 is contained in STD-B31 of the ARIB standard, "TRANSMISSION SYSTEM FOR DIGITAL TERRESTRIAL TELEVISION BROADCASTING". QAM modulation is used in the example in FIG. 2. As shown in FIG. 2, one carrier in one frame is used for transmitting TMCC. The shaded cells in FIG. 2 represent SP (Scattered Pilot) symbols.

Table 1 below shows a configuration of 204 bits (B0 to B204) of TMCC in an OFDM frame.

TABLE 1

| | |
|---|---|
| B0 | Reference for differential demodulation |
| B1-B16 | Synchronization signal (w0 = 0011010111101110, w1 = 1100101000010001) |
| B17-B19 | Identification of segment format |
| B20-B121 | TMCC information |
| B122-B203 | Parity bits |

The synchronization signal in TMCC detected by the TMCC detecting circuit 13 is provided to a frame synchronization detecting circuit 14. As shown in Table 1, 16 bits, B1 to B16, in each frame represent a synchronization signal. The frame synchronization detecting circuit 14 detects the same pattern that is specified by bits B1 to B16 in Table 1 as a synchronization signal. The frame synchronization detecting circuit 14 detects the synchronization pattern at a midpoint in an OFDM frame. The frame synchronization detecting circuit 14 outputs a detection result of the frame synchronization signal to a pseudorandom number generator 15.

Figure 3:
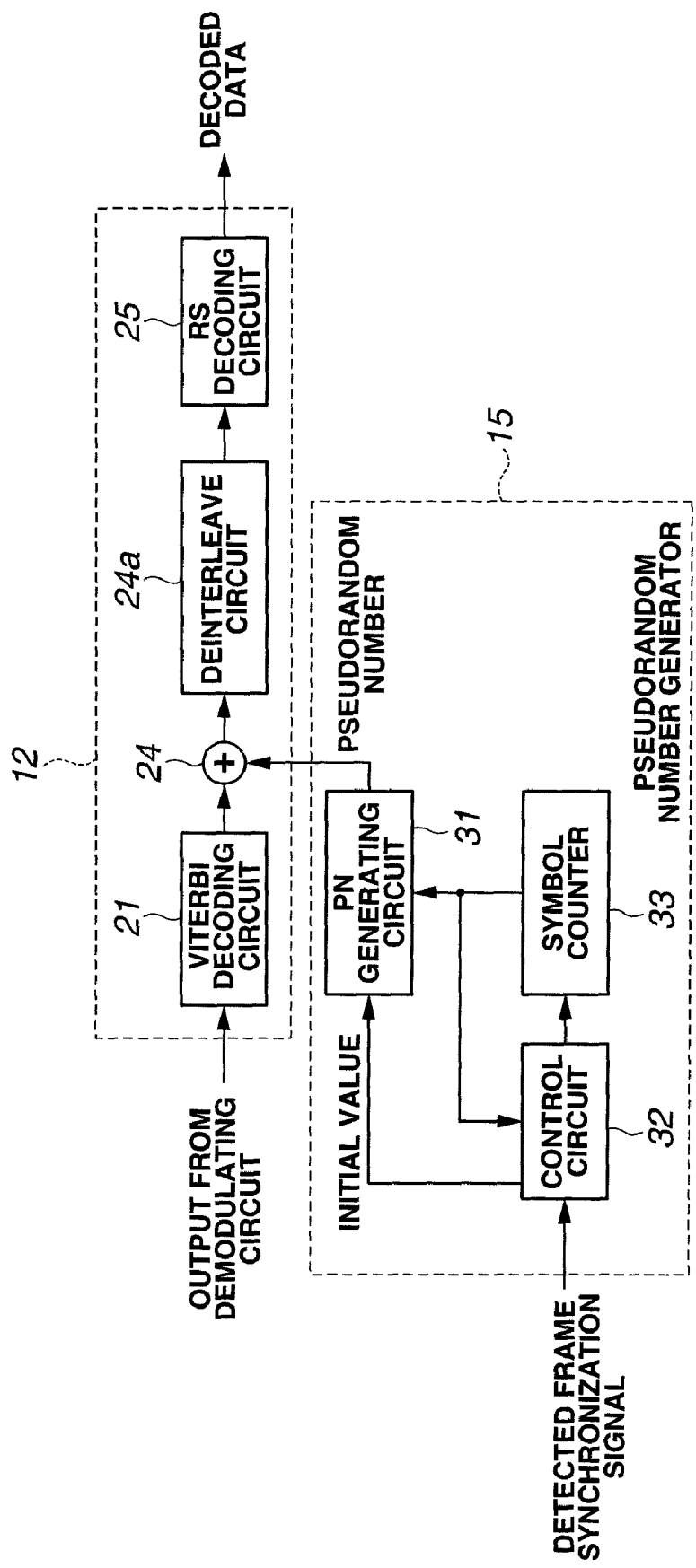
FIG. 3 is a block diagram showing specific configurations of a decoding circuit 12 and a pseudorandom number generator 15.

FIG. 3 is a block diagram showing specific configurations of the decoding circuit 12 and the pseudorandom number generator 15.

Data from the demodulating circuit 11 is provided to a Viterbi decoding circuit 21 in the decoding circuit 12. The Viterbi decoding circuit 21 performs Viterbi decoding of a signal convolutional-coded at a transmitter. An output from the Viterbi decoding circuit 21 is provided to an adder 24. Provided to the adder 24 is a pseudorandom number value from a PN generating circuit 31, which will be described later. The adder 24 adds a pseudorandom number value to an output from the Viterbi decoding circuit 21 after synchronization is established, thereby performing energy despreading. Accordingly, energy despreading in the decoding circuit 12 is enabled by detection of frame synchronization.

An output from the adder 24 is provided to deinterleave circuit 24a. The deinterleave circuit 24a performs the reverse of interleaving performed at the transmitter. An output from the deinterleave circuit 24a is provided to an RS decoding circuit 25. The RS decoding circuit 25 corrects errors in transmission to restore original data and outputs it as decoded data.

In the present embodiment, pseudorandom number values used in the decoding circuit 12 can be obtained in the pseudorandom number generator 15.

A detected frame synchronization signal from the frame synchronization detecting circuit 14 is provided to a control circuit 32 in the pseudorandom number generator 15. The pseudorandom number generator 15 includes a PN generating circuit 31 that generates pseudorandom number values. The PN generating circuit 31 is given an initial value by the control circuit 32 and generates a pseudorandom number value every time a clock is input. Typically, the same initial value that was set at the transmitter is set in the PN generating circuit 31 at the timing of the start of a frame and a clock of a symbol period is provided to the PN generating circuit 31 to enable the PN generating circuit 31 to generate a pseudorandom number value required for energy despreading.

The clock is provided from a symbol counter 33 to the PN generating circuit 31. The symbol counter 33 counts signals of the OFDM periods under the control of the control circuit 32. That is, a count value of the symbol counter 33 after frame synchronization is established matches an OFDM symbol number. The symbol counter 33 outputs a clock to the PN generating circuit 31 at every count.

In the present embodiment, the control circuit 32 allows the PN generating circuit 31 to run freely until a frame synchronization signal is input. That is, the control circuit 32 allows the symbol counter 33 to generate a clock at every symbol period, for example, regardless of whether frame synchronization is detected by the frame synchronization detecting circuit 14. Accordingly, the count value of the symbol counter 33 does not match an OFDM symbol number until the frame synchronization detecting circuit 14 detects a frame synchronization signal.

In the present embodiment, the control circuit 32 provides an initial value to the PN generating circuit 31 regardless of whether a frame synchronization signal is detected or not and allows the symbol counter 33 to start counting at the time when the initial value is set in the PN generating circuit 31. When a detected frame synchronization signal is provided from the frame synchronization detecting circuit 14 to the control circuit 32, the control circuit 32 increases or decreases the speed of counting by the symbol counter 33 (or stops counting) so that the count value of the symbol counter 33 matches the position (symbol number) of the frame synchronization signal in the OFDM frame.

For example, the control circuit 32 causes the symbol counter 33 to count up at a higher or lower speed so that the count value matches the symbol number within a time, for example one to several symbol durations, if the count value of the symbol counter 33 is smaller or greater than the symbol number of the frame synchronization signal. The symbol counter 33 provides a clock to the PN generating circuit 31 every time the symbol counter 33 counts up, and the PN generating circuit 31 generates a pseudorandom number value every time a clock is input in the PN generating circuit 31. Thus, the pseudorandom number value from the PN generating circuit 31 will match a symbol number in input data within a time period of one to several symbol durations.

Figure 4A:
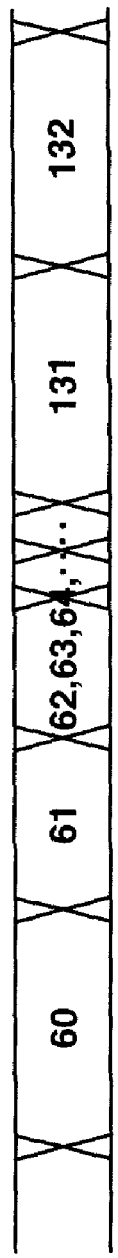
FIGS. 4A, 4B, and 4C are diagrams illustrating an operation of the pseudorandom number generator.
Figure 4B:
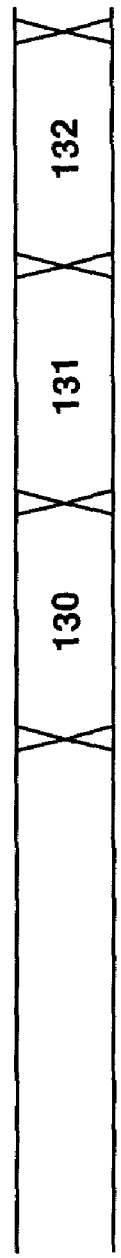
Figure 4C:
Figure 5:
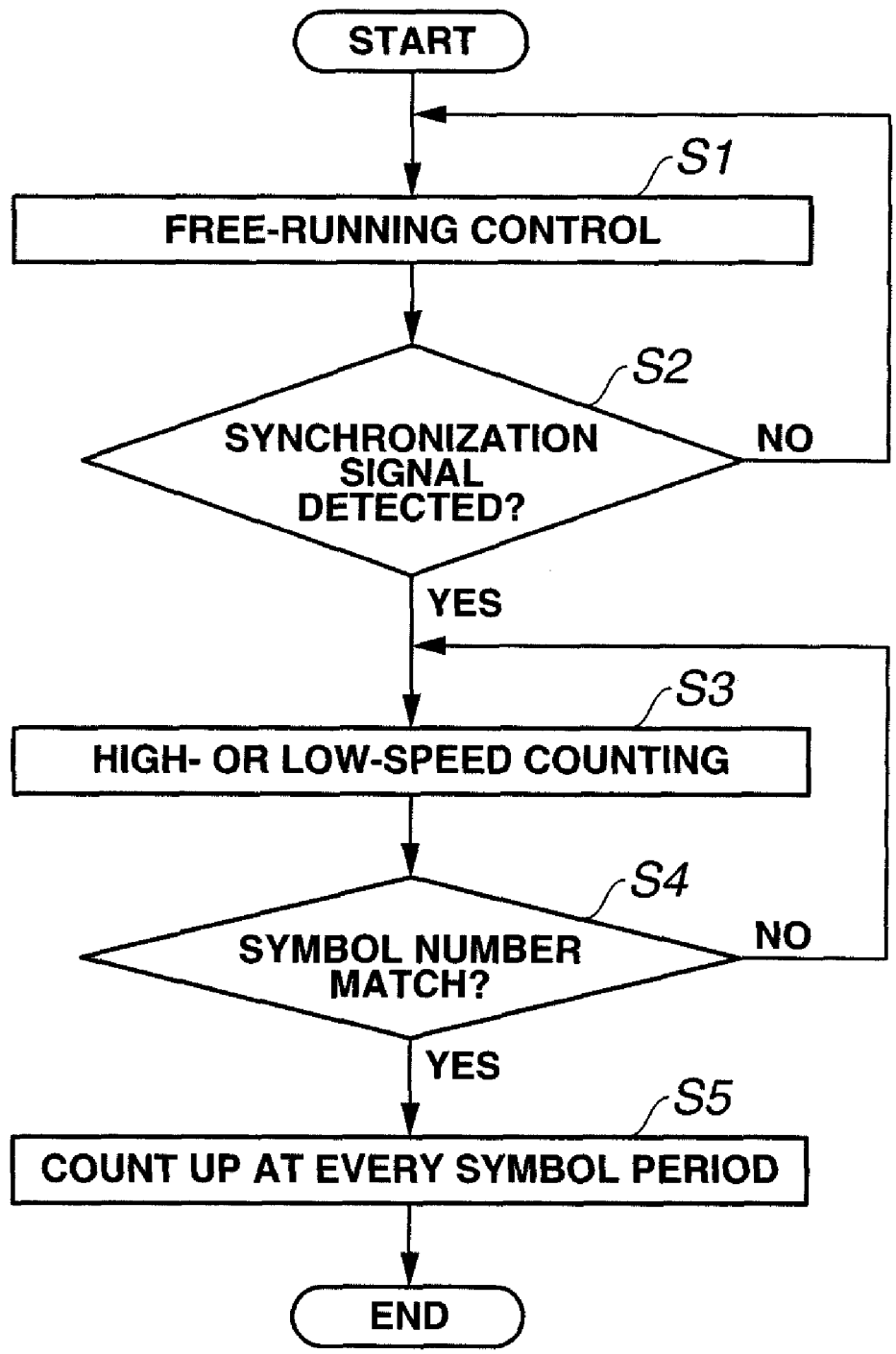
FIG. 5 is a flowchart illustrating an operation according to the first embodiment.

An operation of the embodiment configured as described above will be described below with reference to FIGS. 4A, 4B, 4C, and 5. FIGS. 4A, 4B, and 4C are diagrams illustrating an operation of the pseudorandom number generator 15 and FIG. 5 is a flowchart showing an operation flow. FIG. 4A shows count values of the symbol counter 33, starting at the time when an initial value is set; FIG. 4B shows symbol numbers of received data, and FIG. 4C shows the timing of detection of a synchronization signal. The example shown in FIGS. 4A, 4B, and 4C differs from the example shown in FIG. 2 in that the last symbol number of a synchronization signal pattern is 129.

A baseband OFDM signal is input in the receiving circuit 10. The receiving circuit 10 removes guard intervals from the baseband OFDM signal and transforms the OFDM signal in the time domain to an OFDM symbol in the frequency domain by using FFT (Fast Fourier transform). The OFDM symbol is provided to the demodulating circuit 11. The demodulating circuit 11 restores original data from the input OFDM symbol. The demodulating circuit 11 provides an OFDM frame to the decoding circuit 12. The Viterbi decoding circuit 21 in the decoding circuit 12 decodes the output from the demodulating circuit 11 using Viterbi decoding and outputs the decoded data to the adder 24 which performs energy despreading.

It is assumed here that synchronization with the received OFDM signal has not been established as in a time immediately after the receiver in FIG. 1 is powered on or channel switching. The control circuit 32 of the pseudorandom number generator 15 controls the PN generating circuit 31 to allow the PN generating circuit 31 to run freely at step S1 of FIG. 5. In particular, the control circuit 32 sets an initial value in the PN generating circuit 31 immediately after power on or channel switching and causes the PN generating circuit 31 to start counting at the timing of the initial value setting.

A count value of the symbol counter 33 is provided to the control circuit 32. A clock is provided to the PN generating circuit 31 each time the symbol counter 33 counts up. The PN generating circuit 31 generates a pseudorandom number at every clock. The count value of the symbol counter 33 has not yet matched a symbol number of an OFDM frame during being received and therefore the adder 24 cannot perform energy despreading using a pseudorandom number value from the PN generating circuit 31.

On the other hand, an OFDM frame is provided from the demodulating circuit 11 to the TMCC detecting circuit 13. The TMCC detecting circuit 13 detects TMCC inserted in each OFDM frame and provides the TMCC to the frame synchronization detecting circuit 14. When the frame synchronization detecting circuit 14 detects a synchronization signal contained in TMCC, the frame synchronization detecting circuit 14 provides the detected synchronization signal to the control circuit 32.

The control circuit 32 determines at a step S2 whether a synchronization signal has been detected. If a synchronization signal has been detected, the control circuit 32 increases or decreases the speed of counting of the symbol counter so that the count value of the symbol counter 33 matches the symbol number of an OFDM frame during being received within a short of time (step S3).

It is assumed here that a synchronization signal is detected at the point of time when the count value of the symbol counter 33 changes from 61 to 62 as shown in FIGS. 4A, 4B, and 4C. The control circuit 32 controls the symbol counter 33 to cause the symbol counter 33 to increase the speed of counting. As a result, the symbol counter 33 counts up faster and, in the duration of one symbol of the OFDM frame, the count value of the symbol counter 33 reaches the symbol number (131) of the OFDM symbol during being received, as shown in FIGS. 4A, 4B, and 4C.

The control circuit 32, after detecting the frame synchronization signal determines whether the symbol number of the OFDM frame during being received matches the count value of the symbol counter 33 (step S4). Once the count value of the symbol counter 33 matches the symbol number as a result of the faster counting up of the symbol counter 33, the control circuit 32 provides a signal of a symbol period to the symbol counter 33 to cause the symbol counter 33 to count up at every symbol period as shown in FIGS. 4A and 4B (step S5).

The symbol counter 33 provides a clock to the PN generating circuit 31 on every count even during the fast counting. The PN generating circuit 31 generates a pseudorandom number value every time a clock is input. The pseudorandom number from the PN generating circuit 31 changes to a value corresponding to the symbol number, 131, in one symbol duration after detection of the synchronization signal.

Thus, the adder 24 can start energy despreading within a very short time after the synchronization signal is detected. The adder 24 adds an output from the Viterbi decoding circuit 21 to a pseudorandom number value from the PN generating circuit 31 to accomplish energy despreading. An output from the adder 24 is deinterleaved by the deinterleave circuit 24a, decoded by the RS decoding circuit 25, and is output as decoded data.

In the present embodiment, the speed of counting of the symbol counter is increased or decreased to cause the symbol count value to match the symbol number of an OFDM signal being received, thereby causing the PN generating circuit to generate a pseudorandom number value in a short time that enables energy despreading. Consequently, frame synchronization can be established within a very short time after a frame synchronization signal is detected.

While the synchronization signal is detected when the count value of the symbol counter 33 is smaller than the symbol number in the example described above and shown in FIGS. 4A, 4B, and 4C, similar control can be achieved in an example in which a synchronization signal is detected when the count value of the symbol counter 33 is greater than the symbol number. In that case, as well, the speed of counting of the symbol counter is increased or decreased to enable the count value to match the symbol number in a short time. It should be noted that when a count value is smaller than a symbol number while the symbol counter is counting at a low speed (including during a period in which the symbol counter is not counting), a certain amount of time is required for the symbol number to reach the count value but, by allowing the symbol counter to count fast, frame synchronization can be established in a sufficiently short time regardless of whether the count value is smaller or greater than the symbol number, depending on the speed of counting.

Second Embodiment

FIG. 6 is a block diagram showing a second embodiment of the present invention. The same components in FIG. 6 as those in FIG. 1 are labeled with the same reference numerals and the description of which will be omitted.

In the first embodiment, detecting a frame synchronization signal in TMCC in an OFDM frame controls the PN generating circuit. However, it can be unable to detect a frame synchronization signal from an OFDM frame immediately after reception, depending on the timing or the like of the channel switching, because the frame synchronization signal is transmitted only once in an OFDM frame. In such a case, synchronization is not established until reception of a next OFDM frame. In the second embodiment, a certain pattern other than a synchronization signal is detected in TMCC so that synchronization is established in a short time.

The second embodiment differs from the first embodiment in that a pattern detecting circuit 16 is added and the frame synchronization detecting circuit 14 is replaced with a frame synchronization detecting circuit 41. The pattern detecting circuit 16 detects a certain pattern in TMCC and provides a result of the detection to the frame synchronization detecting circuit 41.

Table 2 below shows specific bit allocation of TMCC information.

TABLE 2

| | | |
|---|---|---|
| B20-B21 | System identification | |
| B22-B25 | Indicator of transmission-parameter switching | |
| B26 | Start flag for emergency-alarm broadcasting | |
| B27 | Current | Partial reception flag |
| B28-B40 | information | Transmission parameter information for layer A |
| B41-B53 | | Transmission parameter information for layer B |
| B54-B66 | | Transmission parameter information for layer C |
| B67 | Next | Partial reception flag |
| B68-B80 | information | Transmission parameter information for layer A |
| B91-B93 | | Transmission parameter information for layer B |
| B94-B106 | | Transmission parameter information for layer C |
| B107-B109 | Connected transmission phase correction amount | |
| B110-B121 | Reserved | |

The transmission parameter information for layer C in Table 2 is used when transmission is performed in layer C. At present, transmission is rarely performed in layer C and C-layer transmission parameter information is all "1s". For example, if 13 successive bits in TMCC are "1s", the pattern detecting circuit 16 determines that those bits are the 54th to 66th bits, B54-B66, in the TMCC and outputs the result to the frame synchronization detecting circuit 41 indicating that bits B54-B66 has been detected. The frame synchronization detecting circuit 41 provides a detected synchronization signal or a result indicating detection of a pattern provided from the pattern detecting circuit 16 to a control circuit 32 of a pseudorandom number generator 15. The control circuit 32 of the pseudorandom number generator 15 controls a symbol counter 33 on the basis of not only the detected frame synchronization signal but also the result of detection provided from the pattern detecting circuit 16.

An operation of the embodiment configured as described above will be described below with reference to FIGS. 7A, 7B, and 7C. FIG. 7A shows TMCC during being received, FIG. 7B shows symbol numbers, and FIG. 7C shows timing of detection of a predetermined pattern by the pattern detecting circuit 16.

A TMCC from a TMCC detecting circuit 13 is provided to the frame synchronization detecting circuit 41 and also to the pattern detecting circuit 16. The pattern detecting circuit 16 detects a known pattern in TMCC and outputs the result of detection to the frame synchronization detecting circuit 41. The frame synchronization detecting circuit 41 outputs a detected frame synchronization signal or a result of detection provided from the pattern detecting circuit 16 to the pseudorandom number generator 15.

The control circuit 32 controls the symbol counter 33 on the basis of a detected frame synchronization signal or a result of detection provided from the pattern detecting circuit 16. When the control circuit 32 uses the detected frame synchronization signal, the control circuit 32 controls in the same way as described with respect to the first embodiment.

It is assumed here that channel switching is made immediately after a synchronization signal in the TMCC appears. The synchronization signal immediately after channel switching is not detected by the frame synchronization detecting circuit 41. If C-layer transmission parameter information is not used, the 54th to 66th bits B54-B66 in the TMCC are all "1s". When the pattern detecting circuit 16 detects that 13 bits or more are "1s", the pattern detecting circuit 16 outputs a result of detection indicating that the 54th to the 66th bits B54-B66 in the TMCC are all "1s" (see FIG. 7C).

The result of detection is provided to the control circuit 32 through the frame synchronization detecting circuit 41. In this case, information indicating the symbol position of the detected pattern in the TMCC from the frame synchronization detecting circuit 41 is also provided to the control circuit 32. The control circuit 32 controls the symbol counter 33 to increase the speed of counting. As a result, the symbol counter 33 is caused to count up at a higher speed to match the count value of the symbol counter 33 to the symbol number (67) in an OFDM symbol being received within one symbol duration in an OFDM frame, for example.

Once the count value of the symbol counter 33 matches the symbol number as a result of the faster counting up of the symbol counter 33, the control circuit 32 provides a signal of a symbol period to the symbol counter 33 to cause the symbol counter 33 to count up at every symbol period. Thus, an adder 24 can start energy despreading in a very short time after the synchronization signal is detected.

The other operations of the second embodiments are the same as those of the first embodiment.

In this way, a symbol number of received data is determined by using a known pattern of TMCC in addition to a frame synchronization signal and therefore a pseudorandom number value can be matched to a symbol number in a short time in the present embodiment. Thus, the time required for establishing synchronization can be reliably reduced even in such a case where switching is made from one channel to another immediately after a frame synchronization signal appears.

While frame synchronization and a predetermined pattern are detected in the second embodiment described above, detection of frame synchronization may be omitted and a predetermined pattern alone may be detected to determine a symbol number of received data. While a pattern of C-layer transmission parameter information is detected in the example described above, any known pattern in TMCC may be detected.

Third Embodiment

FIG. 8 is a block diagram showing a third embodiment of the present invention. The same components in FIG. 8 as those in FIG. 6 are labeled with the same reference numerals and the description thereof will are omitted.

In the second embodiment, if it takes much time to detect a frame synchronization signal, a predetermined pattern in TMCC in an OFDM frame is detected to control a PN generating circuit. However, depending on a symbol preceding or succeeding the predetermined pattern, false pattern detection can occur. Therefore, in the third embodiment, a pilot (SP) signal inserted at predetermined intervals is used to detect a predetermined pattern without fail to establish synchronization in a short time.

The third embodiment differs from the second embodiment in that an SP detecting circuit 17 is added and the frame synchronization detecting circuit 41 is replaced with a frame synchronization detecting circuit 42. The SP detecting circuit 17 detects a symbol pilot (SP) signal in an OFDM frame and provides the result of the detection to the frame synchronization detecting circuit 42. The frame synchronization detecting circuit 42 provides a detected synchronization signal or a result of detection based on outputs from a pattern detecting circuit 16 and the SP detecting circuit 17 to a control circuit 32 of a pseudorandom number generator 15. The frame synchronization detecting circuit 42 also provides information indicating which of the symbol numbers in an OFDM frame are identified by the output result of detection, to the control circuit 32.

The SP signal is inserted in an OFDM frame every four symbols, for example, irrespective of TMCC, as indicated by the shaded cells in FIG. 2. The SP signal was modulated by BPSK modulation. The SP signal was set to a fixed value. Accordingly, which of the four symbols carries the SP signal can be identified. It can be seen from FIG. 2 that a symbol carrying a value that differs from the values in the other three symbols in a unit in the carrier with carrier number 1, for example, is any of the 0th, 4th, 8th, . . . , and 200th symbols.

The SP detecting circuit 17 outputs a result indicating detection of the SP signal to the frame synchronization detecting circuit 42. The frame synchronization detecting circuit 42 outputs a detected synchronization signal or a result indicating detection of an SP signal that matches or is closest to a result of detection by the pattern detecting circuit 16 to the control circuit 32 of the pseudorandom number generator 15. The control circuit 32 controls a symbol counter 33 on the basis of results of detection provided from the pattern detecting circuit 16 and the SP detecting circuit 17 in addition to a result of detection provided from the frame synchronization detecting circuit 14.

An operation of the third embodiment configured as described above will be described below with reference to FIGS. 9A, 9B, and 9C. FIG. 9A shows a TMCC being received, FIG. 9B shows symbol numbers of received data, and FIG. 9C shows timing of detection of an SP by the SP detecting circuit 17.

An OFDM frame from a demodulating circuit 11 in the third embodiment is also provided to the SP detecting circuit 17. The SP detecting circuit 17 detects an SP signal inserted in the OFDM frame and outputs the result of detection to the frame synchronization detecting circuit 42.

The pattern detecting circuit 16 may detect a pattern before the frame synchronization detecting circuit 42 detects a synchronization signal, depending on the timing of channel switching. In such a case, the frame synchronization detecting circuit 42 uses an output from the pattern detecting circuit 16.

It is assumed for example that a pattern a predetermined number of symbols before the 121st symbol of a TMCC is a known pattern (for example a sequence of "1s"). If the 122nd symbol is also "1" as shown in FIGS. 9A, 9B, and 9C, the frame synchronization detecting circuit 42 cannot identify the position in which the pattern is detected. On the other hand, the SP detecting circuit 17 detects any of the symbols that appear every four symbols in an OFDM frame. For example, it is assumed that a symbol detected by the SP detecting circuit 17 is one of the 2nd, 6th, . . . , 122nd, 126th, 130th, . . . .

The frame synchronization detecting circuit 42 identifies the symbol number of a received symbol from outputs from the pattern detecting circuit 16 and the SP detecting circuit 17. That is, the frame synchronization detecting circuit 42 determines that the received symbol is a symbol close to the 121st symbol from the output from the pattern detecting circuit 16. The frame synchronization detecting circuit 42 also determines that an SP signal from the SP detecting circuit 17 close to the timing of detection by the pattern detecting circuit 16 is a symbol position of the SP signal that is close to the 121st symbol position, that is, the 122nd symbol position. Thus, the frame synchronization detecting circuit 42 outputs a result of detection specifying the 122nd symbol position to the control circuit 32 at the timing of detection of the SP signal.

With this, the control circuit 32 identifies the symbol number of the received data and causes the symbol counter 33 to count up faster so that a value of the symbol connecter 33 matches a symbol number. Once the count value of the symbol counter 33 matches the symbol number as a result of the faster counting up by the symbol counter 33, the control circuit 32 provides a signal at every symbol period to the symbol counter 33 to cause the symbol counter 33 to count up at every symbol period. Consequently, an adder 24 can start energy despreading in a very short time after detection of the synchronization signal.

The other operations of the third embodiment are the same as those of the second embodiments.

As described above, an SP signal inserted at every predetermined number of symbols is used to reliably detect the symbol number of received data even when a pattern cannot accurately be detected depending on a symbol preceding or succeeding a known pattern of a TMCC. Thus, a pseudorandom number value can be matched to a symbol number within a short time.

In the third embodiment, detection of frame synchronization may be omitted and a symbol number of received data may be determined only on the basis of detection of a predetermined pattern and detection of an SP signal.

While the second and third embodiments have been described with respect to an example in which the result of detection of a pattern is used when the pattern is detected by the pattern detecting circuit before a frame synchronization signal is detected, the output from the pattern detecting circuit may be used only during pull-in and thereafter only the result of detection of a frame synchronization signal may be used.

The present embodiments described above have the advantageous effects of reducing the time required for establishing synchronization using a simple configuration.

Having described the embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. A receiver comprising:
    a receiving section configured to receive digital broadcasts;
    a demodulating section configured to demodulate a signal received by the receiving section and output a frame-based signal including a plurality of symbols;
    a detecting section configured to detect a symbol position in a frame-based signal provided from the demodulating section;
    a decoding section configured to decode a frame-based signal from the demodulating section in accordance with a symbol position;
    a symbol counter configured to output a count output specifying a symbol position in a signal decoded in the decoding section; and
    a control section configured to control counting of the symbol counter on the basis of a symbol position detected by the detecting section and a count value of the symbol counter.

2. The receiver according to claim 1, wherein the decoding section comprises:
    a pseudorandom number generator configured to generate a pseudorandom number value based on a count output from the symbol counter; and
    an adder configured to add a frame-based signal from the demodulating section and the pseudorandom number value together.

3. The receiver according to claim 1, wherein the frame-based signal includes a transmission scheme signal; and
    the detecting section detects the symbol position by using at least one of a synchronization signal and a known pattern in the transmission scheme signal.

4. The receiver according to claim 3, wherein a transmission scheme of the received signal is an OFDM scheme.

5. The receiver according to claim 3, wherein the frame-based signal includes a pilot signal inserted at a predetermined symbol phase; and
    when the known pattern is used for detecting the symbol position, the detecting section corrects a result of detection of the known pattern by using the pilot signal and provides the corrected result as the result of detection of the symbol position.

6. The receiver according to claim 5, wherein a transmission scheme of the received signal is an OFDM scheme.

7. The receiver according to claim 3, wherein the detecting section identifies the symbol position by using the known pattern only during pull-in and subsequently identifies the symbol position using the synchronization signal.

8. The receiver according to claim 5, wherein the detecting section identifies the symbol position by using the known pattern only during pull-in and subsequently identifies the symbol position using the synchronization signal.

9. A receiver comprising:
    a demodulating section configured to demodulate a received signal of broadcasting and output a frame-based signal including a plurality of symbols;
    a detecting section configured to detect a symbol position in a frame-based signal provided from the demodulating section;
    a decoding section configured to decode a frame-based signal provided from the demodulating section in accordance with a symbol position;
    a symbol counter configured to output a count output specifying a symbol position in a symbol decoded in the decoding section; and
    a control section configured to control a speed of counting by the symbol counter to cause a count value of the symbol counter to match a symbol position detected by the detecting section.

10. The receiver according to claim 9, wherein the frame-based signal includes a transmission scheme signal; and
    the detecting section detects the symbol position by using at least one of a synchronization signal and a known pattern in the transmission scheme signal.

11. The receiver according to claim 10, wherein the frame-based signal includes a pilot signal inserted at a predetermined symbol phase; and
    the detecting section corrects a result of detection of the known pattern by using the pilot signal and provides the corrected result as the result of detection of the symbol position.

12. A receiving method comprising:
    receiving a signal of digital broadcasting;
    demodulating the received signal to output a frame-based signal including a plurality of symbols;
    detecting a symbol position in the frame-based signal;
    decoding the frame-based signal in accordance with a symbol position;
    outputting, as a count value, a count output specifying a symbol position in the decoded signal; and
    controlling counting on the basis of the symbol position and the count value.

13. The receiving method according to claim 12, wherein, when a symbol position in the frame-based signal is detected, a speed of counting is immediately controlled to cause the count value to match the symbol position.

14. The receiving method according to claim 12, wherein a pseudorandom number value is generated on the basis of the count value, and the frame-based signal and the pseudorandom number value are added together in decoding of the frame-based signal.

15. The receiving method according to claim 12, the frame-based signal includes a transmission scheme signal and the symbol position is detected by using at least one of a synchronization signal and a known pattern in the transmission scheme signal.

16. The receiving method according to claim 15, wherein a transmission scheme of the received signal is an OFDM scheme.

17. The receiving method according to claim 15, wherein the frame-based signal includes a pilot signal inserted at a predetermined symbol phase and, when the known pattern is used for detecting the symbol position, a result of detection of the known pattern is corrected by using the pilot signal and the corrected result is provided as the result of detection of the symbol position.

18. The receiving method according to claim 17, wherein a transmission scheme of the received signal is an OFDM scheme.

19. The receiving method according to claim 15, wherein the symbol position is identified by using the known pattern only during pull-in of the frame-based signal and subsequently the symbol position is identified by using the synchronization signal.

20. The receiving method according to claim 17, wherein the symbol position is identified by using the known pattern only during pull-in of the frame-based signal and subsequently the symbol position is identified by using the synchronization signal.

* * * * *